United States Patent [19]

Tenhover et al.

[11] Patent Number: 5,114,785
[45] Date of Patent: May 19, 1992

[54] SILICON BASED INTERMETALLIC COATINGS FOR REINFORCEMENTS

[75] Inventors: M. A. Tenhover, Solon; D. B. Lukco, Sagamore Hills, both of Ohio

[73] Assignee: The Standard Oil Company, Cleveland, Ohio

[21] Appl. No.: 594,248

[22] Filed: Oct. 9, 1990

[51] Int. Cl.$^5$ .......................... B32B 7/00; B32B 9/00; D02G 3/00; C04B 35/02
[52] U.S. Cl. .................................. 428/263; 428/245; 428/260; 428/272; 428/367; 428/368; 428/375; 428/378; 428/391; 428/902; 428/336; 501/95; 501/97; 501/98
[58] Field of Search ............... 428/378, 391, 902, 263, 428/245, 260, 272, 367, 368, 375; 501/95, 97, 98; 204/290 R, 293; 75/241, 232

[56] References Cited

U.S. PATENT DOCUMENTS

| | | | |
|---|---|---|---|
| 3,811,920 | 5/1974 | Galasso et al. | 428/368 |
| 4,315,968 | 2/1982 | Suplinskas et al. | 428/367 |
| 4,339,270 | 7/1982 | Hashimoto et al. | 204/293 |
| 4,340,636 | 7/1982 | DeBolt et al. | 428/367 |
| 4,642,271 | 2/1987 | Rice | 428/367 |
| 4,696,731 | 9/1987 | Tenhover | 204/290 R |
| 4,770,701 | 9/1988 | Henderson et al. | 75/232 |
| 4,909,872 | 3/1990 | Jarmon | 428/902 |

Primary Examiner—George F. Lesmes
Assistant Examiner—James D. Withers
Attorney, Agent, or Firm—Larry W. Evans; Joseph G. Curatolo; Sue E. Phillips

[57] ABSTRACT

The subject invention relates to a coated reinforcement material comprising a reinforcement having a coating or the general formula:

$$A_x Si_{100-x}$$

wherein A is selected from the group consisting of Au, Pt, Ru, Rh,
Ni, Pd, Ir and combinations thereof; and
x is within the range of greater than zero to about 40.

The invention further relates to a high strength, high temperature performance composite comprising a matrix material and a reinforcement material having a coating comprising silicon in combination with at least one of gold, platinum, ruthenium, rhodium, nickel, iridium and palladium.

21 Claims, No Drawings

SILICON BASED INTERMETALLIC COATINGS FOR REINFORCEMENTS

BACKGROUND OF THE INVENTION

The subject invention relates to reinforcements for high temperature composites that are chemically stable and mechanically stable. In particular, the invention relates to reinforcement materials coated with a Si-containing coating that contributes to the oxidation resistance and high temperature performance of the resulting composite material.

Traditionally many commercial applications of high temperature materials have been filled by Ni-, Co-, and Fe-based metal alloys. These materials function well at temperatures below about 800° C., but rapidly lose strength upon exposure to higher temperatures. Thus, in the field of high temperature materials, researchers have focused on the use of heat resistant fibers to reinforce both metallic and ceramic materials. These high strength composites possess a unique combination of high strength, temperature stability, and low density. This allows for their use in materials for aerospace, automotive, and industrial applications.

Silicon-containing materials are known reinforcements for composite materials. These composites potentially possess high toughness levels and good performance characteristics, thereby making them highly suitable for applications which require light-weight structural materials having high elasticity, high strength, shapability, heat stability, electrical conductivity and heat conductivity. These composites are being increasingly investigated for structural applications.

It is known that many fiber-matrix combinations undergo extensive chemical reaction or interdiffusion between the fiber and matrix materials, each of which is likely chosen for the contribution of specific mechanical and/or physical properties to the resulting composite. Such reaction or interdiffusion can lead to serious degradation in strength, toughness, ductility, temperature stability and oxidation resistance. Some changes may result from the difference in the thermal expansion coefficients of the materials.

To compensate for these problems, a variety of coatings have been suggested for reinforcements intended for use in fiber-matrix composites. For example, U.S. Pat. No. 4,340,636 discloses a surface treatment for the formation of a carbon-rich coating on a stoichiometric SiC substrate filament. Similarly, U.S. Pat. No. 4,315,968 discloses coating SiC filaments with a coating of Si-rich SiC.

U.S. Pat. No. 3,811,920 discusses applying a thin layer of TiC to a filamentary substrate having a SiC surface layer. This TiC layer is reported to impart oxidation resistance to the filament and to provide a diffusion barrier between the SiC-surfaced substrate filament and the matrix metals. Boron nitride has also been used as a SiC coating, as in U.S. Pat. No. 4,642,271.

Ceramic matrix materials have experienced problems similar to those enumerated hereinabove when combined with reinforcements to produce high performance composites. The problems being experienced in this technology field are generally a result of the fact that the matrix material technology and fiber technology have evolved independent of one another, resulting in chemical and mechanical incompatibility of the precursor materials used to produce composites of the type disclosed hereinabove. The foregoing citations demonstrate various attempts within the field to overcome the inherent shortcomings of these composites by using coating materials to provide the needed characteristics or compatibility.

However, composite materials which have employed techniques and coatings such as the foregoing nonetheless remain limited for high temperature application by concerns regarding the thermomechanical stability, thermochemical stability, oxidation resistance and high temperature fatigue resistance encountered in atmospheric conditions at temperatures above 800° C. A specific problem encountered with a number of these coatings relates to the chemical reactivity of the coating with the matrix materials, which manifests itself in the failure of the mechanical and physical performance of the material in high temperature environments.

Accordingly, an object of the subject invention is to provide a coating for reinforcement materials which permits the use of the reinforcement in composite materials for use at high temperatures above 800° C.

Another object of the invention is to provide a coating for reinforcement materials which prevents chemical reaction between the reinforcement and the matrix.

A further object is to provide a composite which contains coated reinforcement materials which maintain high strength and toughness and resists oxidation at high temperatures.

SUMMARY OF THE INVENTION

The subject invention relates to a coated reinforcement material comprising a reinforcement material having a coating of the general formula:

$$A_xSi_{100-x}$$

wherein
A is selected from the group consisting of Au, Pt, Ru, Rh, Ni, Ir, Pd and combinations thereof; and
x is within the range of greater than zero to about 40.

The invention further relates to a high strength, high temperature performance composite comprising a matrix material and a reinforcement material having a coating of the general formula $A_xSi_{100-x}$.

DETAILED DESCRIPTION OF THE INVENTION

The subject invention relates to coated reinforcement material for use in composite materials. The coatings disclosed herein are of the general formula:

$$A_xSi_{100-x}$$

wherein A is selected from the group consisting of Au, Pt, Ru, Rh, Ni, Pd, Ir and combinations thereof, and x is present at up to about 40. Exemplary of such coatings are: $Ru_{40}Si_{60}$; $Ru_{20}Pt_{20}Si_{60}$; $Pd_{20}Ru_{20}Si_{60}$; $Pt_{20}Au_{20}Si_{60}$; $Ni_{20}Si_{80}$; $Rh_{20}Pt_{20}Si_{60}$; $Pt_{20}Si_{80}$; and $Ir_{30}Si_{70}$.

The subject coating is compatible with not only the reinforcement to be coated, but also the matrix material with which the coated reinforcement is combined to form a composite. The coating further effectively inhibits diffusion of Si and C, has excellent oxidation resistance, and forms smooth, adherent coatings on reinforcement materials. Because of these characteristics, the resulting composite is capable of maintaining its strength and high temperature performance, even in the presence of air at temperatures exceeding 800° C. for extended periods of time, thus making the composite highly suitable for demanding industrial applications.

The coating, as described herein, can be deposited by any conventionally known thick or thin film deposition process, examples of which include but are not limited to chemical vapor deposition, physical vapor deposition, electrochemical deposition, rf sputtering, reactive sputtering, reactive ion plating, and reactive evaporation. The coating should be deposited in a layer that is from about 0.5 microns to about 10 microns thick, preferably between about 1.0 micron to about 5.0 microns. Optimally, the reinforcement should be completely coated. Minimal areas that remain uncoated will not, however, adversely affect the composite performance due to the localized nature of the reaction sites which exist in uncoated areas.

The reinforcement material to be coated may be any of the following: $Si_3N_4$; SiAlON; Si; AlON; $B_4C$; or SiC. SiC is a readily available commercial item, such as Sigma Fibers from British Petroleum, SCS-6 from Textron, and Nicalon Fibers from Dow Corning. The remaining reinforcements are preferably prepared as a monofilament on a carbon or tungsten core through the use of chemical vapor deposition. Other known film deposition techniques may also be used. In addition, SiAlON, AlON, and SiC reinforcement fibers can be made by pressureless sintering of fine powders and appropriate sintering aides. The reinforcement materials should be in the form of continuous fibers.

The reinforcement material may further be amorphous, polycrystalline or single crystal in nature. An appropriate reinforcement for a given application may be selected from those specified above depending on the optimum characteristics to be attained in the resulting composite, such as strength-per-weight, smoothness, high temperature performance, or toughness, among others.

It may be advantageous, depending on the end use of the material, to form the reinforcement by depositing a reinforcement material listed above on a core material which possesses a very high melting point prior to deposition of the subject coating. Such core material would typically be carbon or a refractory metal, such as W, Mo or Ti, among others. Such reinforcements are commercially available, such as those available from Stackpole Fibers Company and Alfa Inorganics.

Prior to coating any of the reinforcements described above, the reinforcement may be pretreated to enhance the adherence of the coating to the reinforcement and the smoothness of the reinforcement-coating interface. Such pretreatment processes may include chemical etching, ion etching, flame polishing and mechanical polishing, among others, which may be accomplished by conventional pretreatment techniques.

The coated reinforcement may be fabricated into various shapes or may be woven or otherwise structured prior to combination with the matrix material. This fabrication may also be accomplished according to conventional techniques.

For use in complex-shaped components, it is desirable to fabricate the reinforcements into a shape prior to the application of the coating. This can be accomplished for example, by weaving continuous fibers into a three-dimensional shape. However the fabricated shape is prepared, it is important that the shape not be fully dense and preferably that it be about 10-50% dense with no closed porosity. Coating of the reinforcements in the fabricated shape is preferrably accomplished by chemical vapor deposition.

Suitable matrix materials into which reinforcements coated according to this disclosure are to be disposed include ceramic, glass and glass-ceramic matrix composites. Generally, matrix materials include glass ceramics containing at least two of Li, Al, Si, O, Ca, Sr, Ba and Mg, and aluminosilicates modified by the addition of alkali and alkaline earth oxides. Furthermore, the addition of nucleating agents, such as $TiO_2$ can be used to improve the high temperature strength of the matrix. Table I below lists a number of representative matrix materials suitable for use in the subject invention, though the list is not intended to be exhaustive of all possible matrix materials.

TABLE I

| Potential Glass and Ceramic Matrix Materials | | |
|---|---|---|
| $SiO_2$ | $Al_2O_3$ | MgO |
| $SiO_2.Al_2O_3$ | $CaO.3SiO_2$ | $MgO.SiO_22Al_2O_3$ |
| $Li_2O.Al_2O_3.2SiO_2$ | $Li_2O.Al_2O_3.4SiO_2$ | $Li_2O.Al_2O_3.8SiO_2$ |
| $BaO.2SiO_2.2Al_2O_3$ | $CaO.2SiO_2.2Al_2O_3$ | $MgO.CaO.2SiO_2.4Al_2O_3$ |
| $4BaO.8SiO_2.8Al_2O_3.TiO_2$ | | |

Matrix materials may be obtained commercially as reacted powders of the proper composition or may be formulated by blending the appropriate oxides together.

When preparing coated reinforcements by sputtering, the sputter target can be either a homogeneous $A_x Si_{100-x}$ target or an assembly of the appropriate A element and Si designed to produce the desired coating composition. An inert gas, such as argon, will be present as the sputter gas. The total pressure of the sputter gas should be less than about 50 mtorr. The temperature during the deposition process may be anywhere from room temperature to about 800° C. The deposition rate may vary from 1 to about 1000 angstroms/second. The resulting coating is preferably between about 0.5 microns and about 10 microns thick, and have a density of at least about 80%, and preferably greater than 95%.

The efficiency of the diffusion barrier properties of the coating are related to the density of the coating, i.e. density in excess of about 80% corresponds to minimal or no diffusion of elements from the reinforcement to the matrix during use.

A similar coated reinforcement can be prepared by chemical vapor deposition by using halogen, organometallic or metallic compounds containing the designated A elements, in the presence of a combination of $H_2$ and Si compounds, such as $SiH_4$ and $SiCl_4$. The temperature range for such a process is between about 400° C. and about 1000° C. Use of an rf or dc plasma to aid in the deposition process may be necessary.

The coated reinforcement may then be combined with a selected matrix material by any of a number of methods and techniques known to those skilled in the art, such as hot pressing or melt infiltration, among others. Such process should be conducted under vacuum or in an inert atmosphere, such as in the presence of argon.

Composites such as those containing $A_xSi_{100-x}$ coated reinforcement materials are operable in an environment wherein the temperature is up to about 90% of the melting point of the matrix material. Further, such composites are operable at pressures from 0 to about 100 atms., and can be used in air, vacuum or inert atmospheres, such as Ar, $N_2$ or He.

EXAMPLES

The following experimentation was conducted to demonstrate the stability of coated reinforcements at elevated temperatures.

The samples prepared and tested in the following examples were of the structure:

matrix/coating/substrate

Substrate, for purposes of these examples, refers to a finely polished bar of sintered SiC (Alpha SiC sintered with boron sintering aid) which was used as a base upon which to build the composite structure. The coating and matrix layers were applied to the substrate using magnetron sputtering and a commercial S-gun arrangement. A typical procedure was to mount the polished SiC substrate in a cryopumped (base pressure $2 \times 10^{-7}$ torr) vacuum chamber on a sample holder that rotated about the sputter gun to insure an even coverage of the coating. One S-gun was used to deposit the coating layer (0.5 to 2.0 microns) while the matrix (1.0 to 2.0 microns) could be deposited using a second S-gun, thus avoiding the need to break the vacuum between the deposition of the two layers. The sputtering was performed in an argon atmosphere, at a pressure of 1.5 mtorr.

The foregoing process produced smooth, dense, adherent coatings. The thickness of the coating and matrix were determined by a TM-100 thickness monitor in the vacuum chamber.

Following deposition, the samples were tested by exposure at a temperature of 800° C. for 6-12 hours in air in a resistance heated furnace. The samples were loaded into an open ended fused silica tube in which air was gently flowed at low rates over the sample.

The following table, Table II, reports the extent of reaction for various samples prepared as described hereinabove. As can be seen, those samples in which the SiC reinforcement was coated with an $A_xSi_{100-x}$ coating according to the subject invention (B and C), experienced slight or no reaction compared to the remaining SiC reinforcement sample A which contained a coating other than $A_xSi_{100-x}$.

TABLE II

| Sample | Matrix | Coating | Substrate | Result |
|---|---|---|---|---|
| A | $SiO_2$ | Pt | SiC | Extensive reaction |
| B | $SiO_2$ | $Pt_{20}Si_{80}$ | SiC | Stable |
| C | $SiO_2$ | $Ir_{30}Si_{70}$ | SiC | Stable |

X-ray Photoemission Spectroscopy (XPS) was used to determine the extent of reaction between the reinforcement and the matrix. The XPS spectra were acquired on a PHI 5400 XPS instrument using 300 watt Mg $K_\alpha$ x-rays, 1 mm diameter spot size, and 35.75 pass energy. Survey spectra were taken so that all surface components could be identified and higher resolution narrow region scans could then be obtained. The pressure in the main analysis chamber was about $10^{-10}$ torr.

To test the stability of the various coatings described above, samples were prepared consisting of matrix, coating and reinforcement. The matrix was $SiO_2$ and the reinforcement was SiC. The various coatings are described in the Table II. The samples were heat treated in air. XPS depth profiles were taken of the samples with and without the heat treatment. Of primary importance to the question of stability of the matrix/coating/reinforcement is the diffusion of carbon into the coating. A measure of the effectiveness of the coating is the amount of carbon observed in the middle of the coating layer following the heat treatment. Table III gives the ratio of the carbon in the middle of the coating after the heat treatment to the amount of carbon originally present in the middle of the coating. Ratios significantly higher than 1.0 indicate massive diffusion of carbon and failure of the coating to protect the reinforcement from degradation. Ratios near 1.0 indicate excellent performance, minimal or no carbon diffusion, and correspond to stable composite properties. Only the samples with the $A_xSi_{100-x}$ coating on the reinforcement were found to resist degradation in the high temperature, air testing environment, thus illustrating the effectiveness of the subject coating as a diffusion barrier. In Table III, the sample letter designations correspond to those of Table II.

TABLE III

| Sample | Coating | C ratio at ½ coating thickness |
|---|---|---|
| A | Pt | 200/1 |
| B | $Pt_{20}Si_{80}$ | 1/1 |
| C | $Ir_{30}Si_{70}$ | 1/1 |

The foregoing examples have been presented to demonstrate the oxidation and corrosion resistance of reinforcements coated with an $A_xSi_{100-x}$ type coating as set forth herein in air at high temperatures. These examples are not intended to limit the subject invention, the breadth of which is defined by the specification and the claims appended hereto, but are presented rather to aid those skilled in the art in clearly understanding the invention defined herein.

What we claim is:

1. A coated reinforcement comprising a fiber reinforcement having a Si-containing coating of the general formula:

$$A_xSi_{100-x}$$

wherein
A is selected from the group consisting of Au, Pt, Ru, Rh, Ir, Ni, Pd and combinations thereof; and
x is in the range of greater than zero to about 40, said reinforcement is selected from the group consisting of $Si_3N_4$, SiAlON, Si, AlON, $B_4C$ and SiC.

2. The coated reinforcement as in claim 1 wherein said coating is from about 0.5 microns to about 10 microns thick.

3. The coated reinforcement as in claim 1 wherein said coating is from about 1.0 microns to about 5.0 microns thick.

4. The coated reinforcement as in claim 1 wherein said reinforcement is SiC.

5. The coated reinforcement as in claim 1 wherein said reinforcement is a continuous fiber.

6. The coated reinforcement as in claim 1 wherein said reinforcement is pretreated prior to the addition of said coating to said reinforcement to enhance adherence of the coating to the reinforcement.

7. The coated reinforcement as in claim 1 wherein said coated reinforcement material is fabricated into a shape.

8. The coated reinforcement as in claim 1 wherein said coated reinforcement material is woven.

9. The coated reinforcement as in claim 1 wherein said reinforcement is deposited on a core material.

10. The coated reinforcement as in claim 9 wherein said core material is selected from the group consisting of W, Mo and Ti.

11. The coated reinforcement as in claim 9 wherein said reinforcement deposited on said core is SiC.

12. A high strength, high temperature performance composite comprising a fiber reinforcement material having a Si-containing coating of the general formula:

$$A_x Si_{100-x}$$

wherein A is selected from the group consisting of Au, Pt, Ru, Rh, Ir, Ni, Pd and combinations thereof; and x is in the range of greater than zero to about 40, said reinforcement is selected from the group consisting of $Si_3N_4$, SiAlON, Si, AlON, $B_4C$ and SiC, said coated reinforcement being disposed in a matrix material.

13. The composite as in claim 12 wherein said matrix material is selected from the group consisting of ceramic, glass and glass-ceramic materials.

14. The composite as in claim 12 wherein said matrix material is selected from the group consisting of $SiO_2$, $SiO_2.Al_2O_3$, $Li_2O.Al_2O_3.2SiO_2$, $BaO.2SiO_2.2Al_2O_3$, $4BaO.8SiO_2.8Al_2O_3.TiO_2$, $Al_2O_3$, $CaO.3SiO_2$, $Li_2O.Al_2O_3.4SiO_2$, $CaO.2SiO_2.2Al_2O_3$, MgO, $MgO.SiO_2.2Al_2O_3$, $Li_2O.Al_2O_3.8SiO_2$ and $MgO.CaO.2SiO_2.4Al_2O_3$.

15. The composite as in claim 12 wherein said matrix material is selected from the group consisting of $SiO_2$, $Li_2O.Al_2O_3.4SiO_2$, $CaO.2SiO_2.2Al_2O_3$, and $BaO.2SiO_2.2Al_2O_3$.

16. The composite as in claim 12 wherein said coating has a density of greater than 80%.

17. The composite as in claim 12 wherein said coating has a density of greater than 95%.

18. The composite as in claim 12 wherein said coating is from about 0.5 microns to about 10 microns thick.

19. The composite as in claim 12 wherein said coating is from about 1.0 microns to about 5.0 microns thick.

20. The composite as in claim 12 wherein said reinforcement material is a continuous fiber.

21. The composite as in claim 12 wherein said reinforcement material is pretreated prior to the deposition of said coating to enhance adherence of the coating to the reinforcement.

* * * * *